United States Patent [19]

Hsu

[11] Patent Number: 5,950,526
[45] Date of Patent: Sep. 14, 1999

[54] FRUIT DEHYDRATOR

[75] Inventor: Tony Hsu, Yung Kang, Taiwan

[73] Assignee: Lundar Electric Industrial Co., Ltd., Tainan Hsien, Taiwan

[21] Appl. No.: 09/217,895

[22] Filed: Dec. 22, 1998

[51] Int. Cl.[6] .............................. A23B 4/03; A23L 3/16; F26B 3/16; F26B 25/18
[52] U.S. Cl. .............................. 99/476; 34/196; 34/197; 99/483; 219/386; 219/400
[58] Field of Search .............................. 99/330, 339, 340, 99/417, 467, 468, 473–476, 446, 450, 483; 34/237, 238, 195–197, 192, 200; 126/21 A, 200, 21 R, 369, 246, 261; 312/236; 219/400, 401, 385–387, 406; 426/520, 521, 523, 509, 510

[56] References Cited

U.S. PATENT DOCUMENTS

| | | | |
|---|---|---|---|
| 208,925 | 10/1878 | Powers | 34/197 |
| 1,893,694 | 1/1933 | Bohmker | 219/400 |
| 4,065,857 | 1/1978 | Nelson et al. | 99/483 |
| 4,190,965 | 3/1980 | Erickson | 34/196 X |
| 5,215,004 | 6/1993 | Su | 99/483 |
| 5,235,906 | 8/1993 | Hsu | 99/476 X |
| 5,311,673 | 5/1994 | Su | 34/197 |
| 5,420,393 | 5/1995 | Dornbush et al. | 219/400 |
| 5,423,249 | 6/1995 | Meyer | 99/476 |
| 5,437,108 | 8/1995 | Alseth | 34/196 |
| 5,458,050 | 10/1995 | Su | 99/340 |
| 5,579,679 | 12/1996 | Hsu | 99/339 |
| 5,826,498 | 10/1998 | Su | 99/476 |

Primary Examiner—Timothy F. Simone
Attorney, Agent, or Firm—Rosenberg, Klein & Bilker

[57] ABSTRACT

A fruit dehydrator is composed of a base, an isolator, a rotating frame, a screen and a cover. The base has a whirlwinder and a motor and on the top is covered with the isolator which has a blow hole. The motor has a spindle inserted through the center portion of the isolator which top portion is seated with a screen and the rotating frame. The spindle is inserted through the center portions of the isolator, the rotating frame, the screen and the cover so as to link together, which allows the wheels of the rotating frame to rotatably stand on the edge of the base, whereas food are placed on the screen and covered by the cover. By activating the motor, the food on the screen are evenly dehydrated.

3 Claims, 5 Drawing Sheets

FRUIT DEHYDRATOR

BACKGROUND OF THE INVENTION

1. Field of the Invention

This invention relates to a fruit dehydrator, and more particularly to a dehydrator has a screen driven by a motor to dehydrate food evenly.

2. Prior Art

A conventional food dehydrator, as shown in FIG. 5, includes a whirlwinder A mounted at the bottom of a base B, and a fan C is on the top of the whirlwinder A. A screen D seats on the base B and is covered by a cover E. In practice, food or fruit are placed on the screen D, the fan C of the base B hales air from outside of the machine and then heats by the whirlwinder A. The heated wind blows direct to the screen D to dry the food or fruit. This design provides the heated wind in a fixed direction which can not dry the food or fruit evenly.

SUMMARY OF THE INVENTION

It is the primary object of the present invention to provide a food dehydrator which dehydrates food or fruit evenly.

It is another object of the present invention to provide a food dehydrator which is an energy saver and is more sophisticated in technology.

DETAILED DESCRIPTION OF THE PREFERRED EMBODIMENTS

Figure 1:
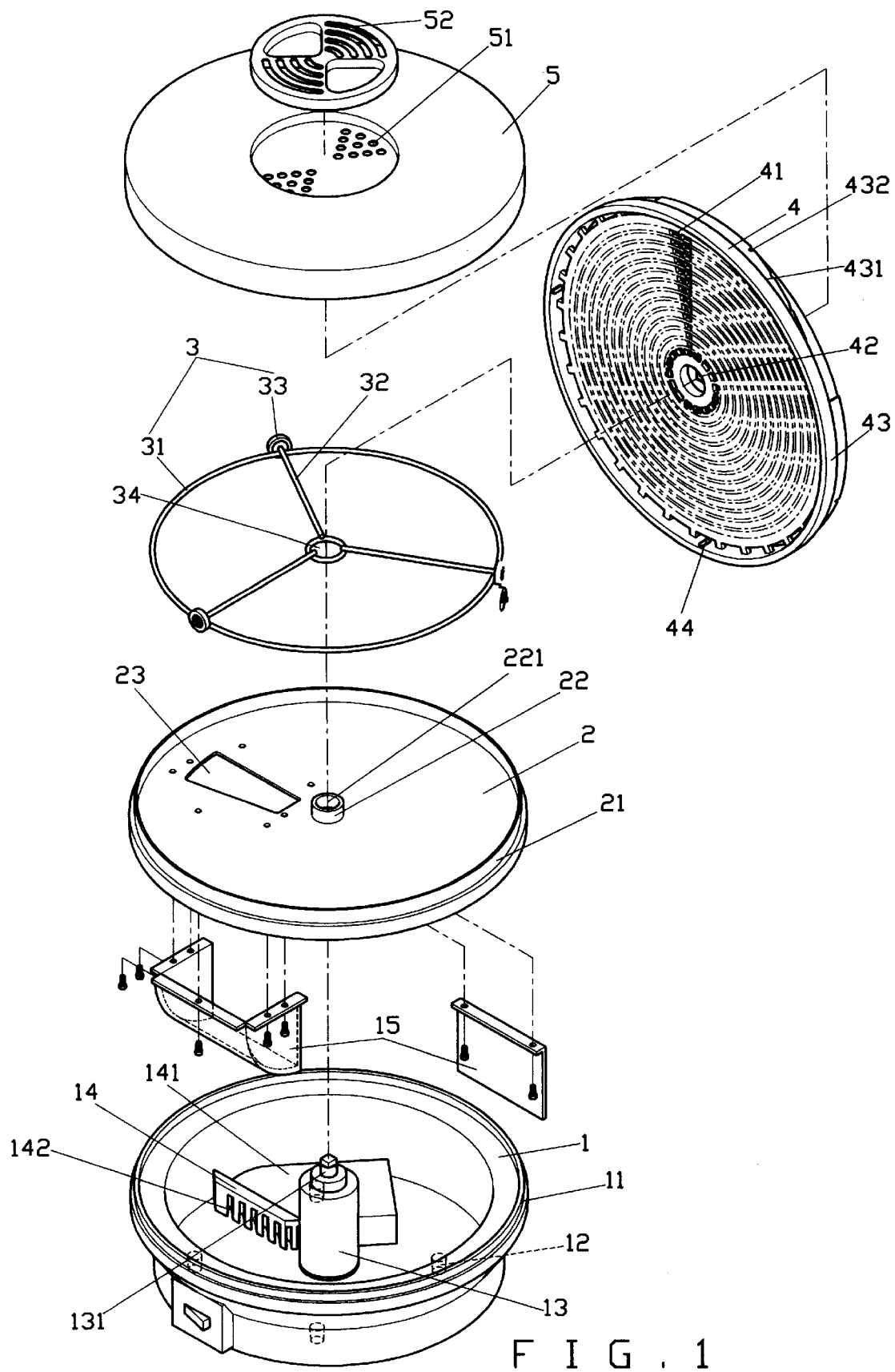
FIG. 1 is a perspective view of the present invention.

Referring to FIG. 1, the present invention includes a base 1, an isolator 2, a rotating frame 3, a screen 4 and a cover 5.

The base 1 is a round plate having a hollow center portion. A lip 11 is extended around the top edge. A plural stands 12 are at the bottom of the base 1. A spindle 131 of a motor 13 vertically extends from the center portion of the base 1 (which may be in different angle or a non circular shape). A whirlwinder 14 is eccentrically mounted in the base 1 and is secured by a case 141. The whirlwinder 14 inhales air from outside of the dehydrator and blows out from an outlet 142, and the heat wind rises direct and is blocked by a wall 15.

The isolator 2 is formed corresponding to the shape of the base 1, having a thicker edge 21, a boss 22 protruding from the center portion with an aperture 221 at the center thereof, and a blow aperture 23(which can be formed with a plurality of holes).

The rotating frame 3 is formed with a circular frame 31 having a plural ribs 32 extending centrally and is connected with a small ring 34. Each rib 32 has a wheel 33 at the end on the frame 31.

The screen 4 has a plurality of air passages 41 spreading all over the surface. A lip 43 is extended on the edge having a slope 431 and a locator 432. At the center of the screen 4 has an aperture 42, and a plural stoppers 44 are extending spaced along the inner bottom edge of the screen 4.

The cover 5 comprises a plurality of holes 51 at the center portion and a knob 52 to cover the holes 51 as a controller.

Figure 2:
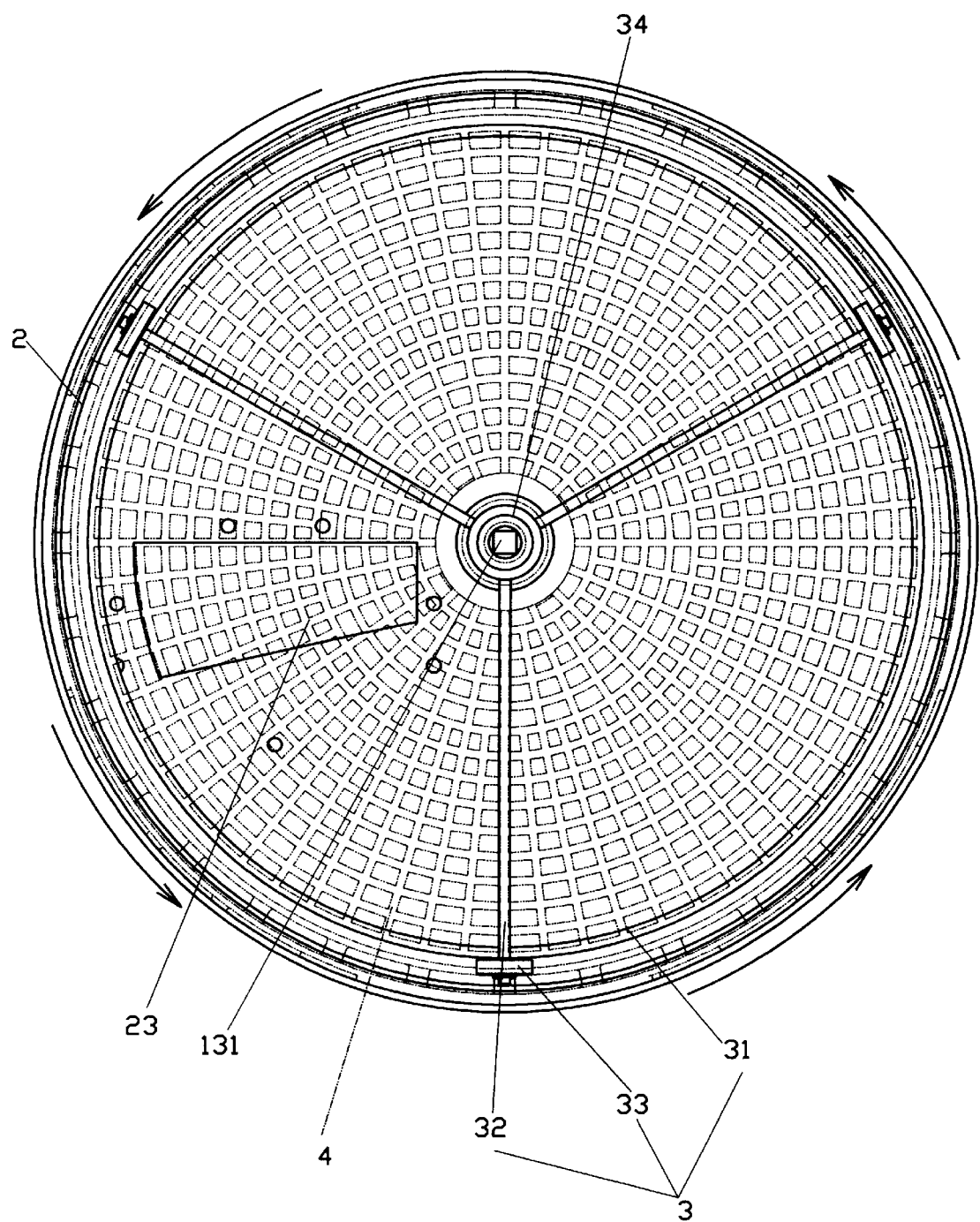
FIG. 2 is a top view of a screen of the present invention.
Figure 3:
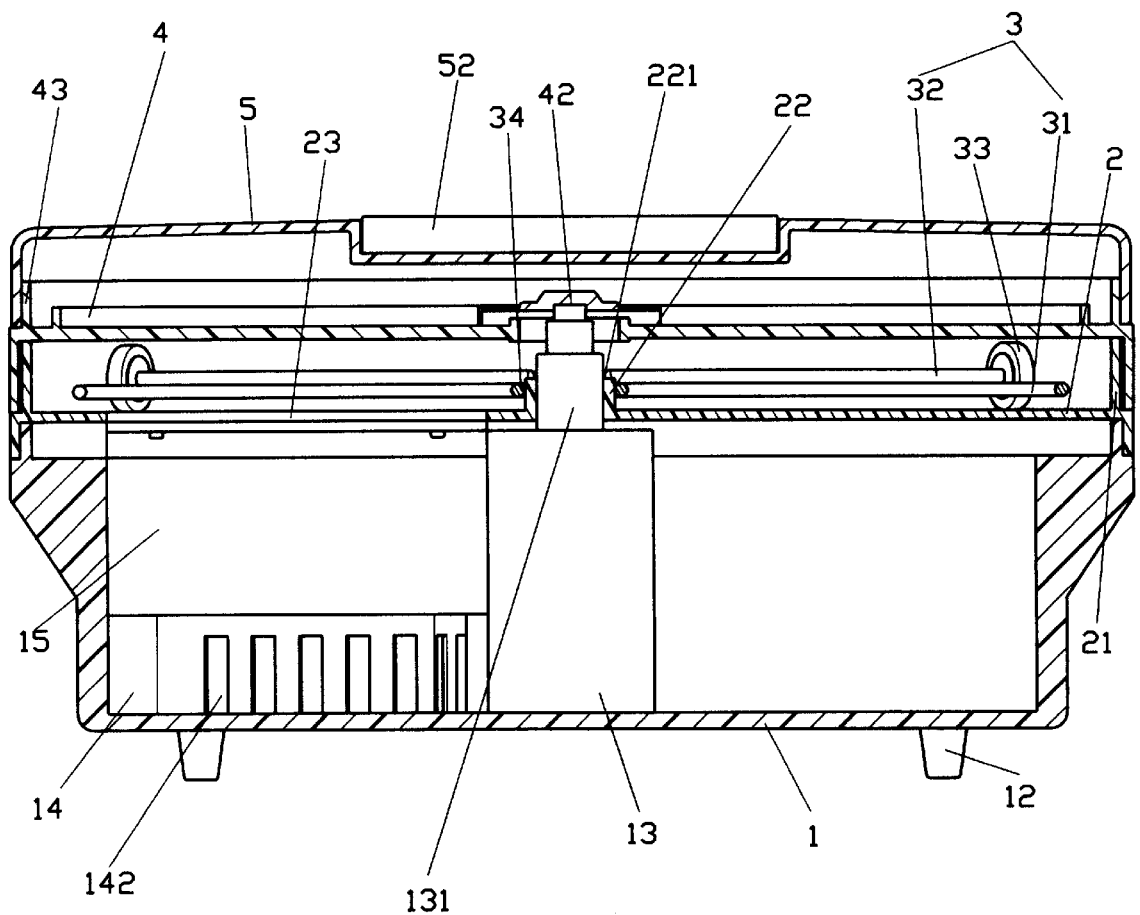
FIG. 3 is a side view of the present invention, partially sectioned.

To assemble, as shown in FIGS. 2 and 3, place the isolator 2 on the base 1 and the aperture 23 of the isolator 2 corresponds to the air outlet 142 of the whirlwinder 14. The spindle 131 of the motor 13 is extending through the aperture 221 of the isolator 2, the small ring 34 of the rotating frame 3, and the aperture 42 of the screen 4. The rotating frame 3 is seating on the isolator 2 with the wheels 33 on the edge to support the rotating frame 3 and to rotate thereon as well. The screen 4 is seating on the rotating frame 3 and is covered with the cover 5.

To operate the present invention, place food or fruit on the screen 4, and cover with the cover 5 to form a vacuum space. The heat wind is blown from the outlet 142 of the whirlwinder 14 and blocked by the wall 15 to rise direct and pass through the aperture 23 of the isolator 2. Whereas the spindle 131 of the motor 13 spins the screen 4, simultaneously to rotate the wheels 33 of the rotating frame 3 stably. Thus an evenly dried fruit or food are formed.

Figure 4:
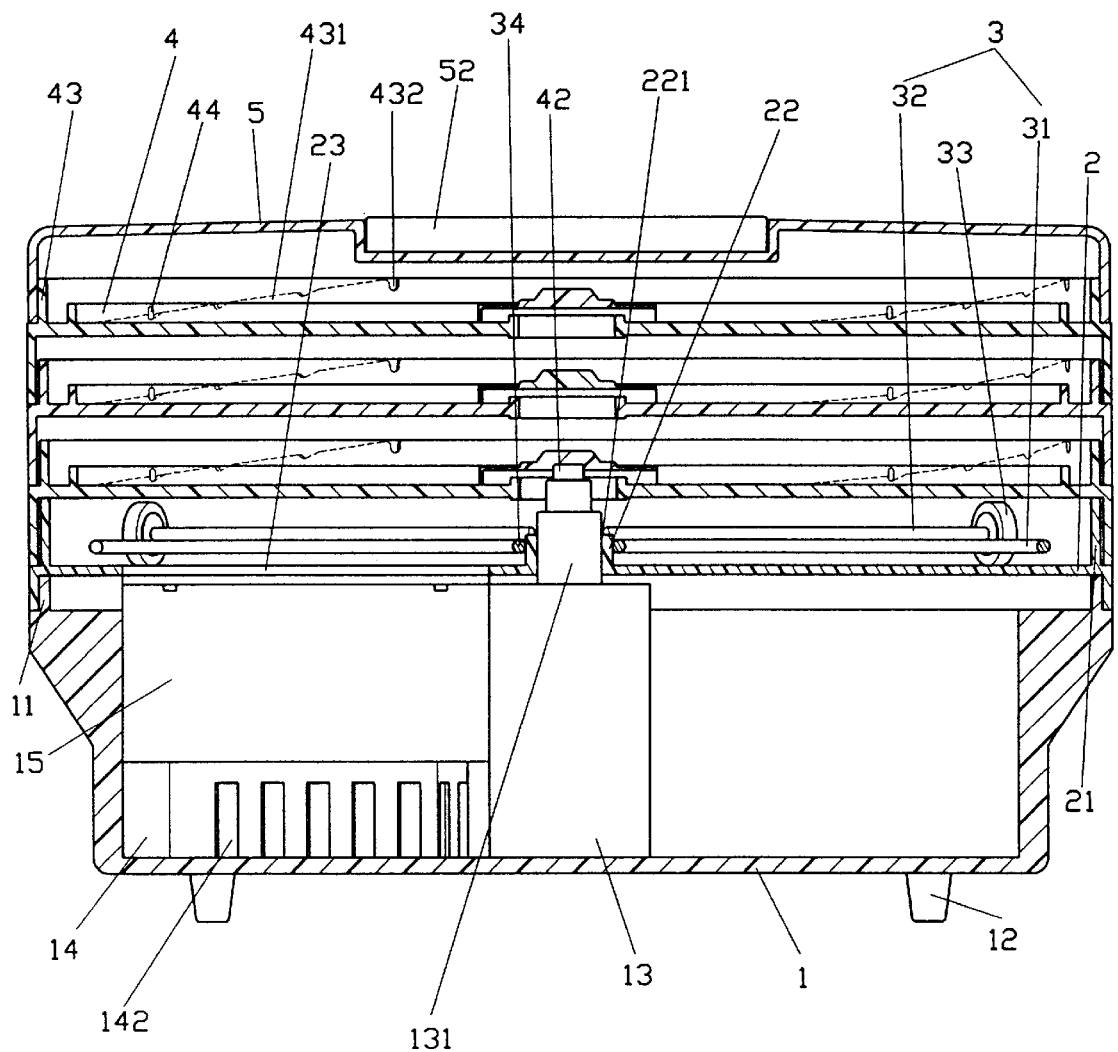
FIG. 4 is a view similar to FIG. 3, in operation.
Figure 5:
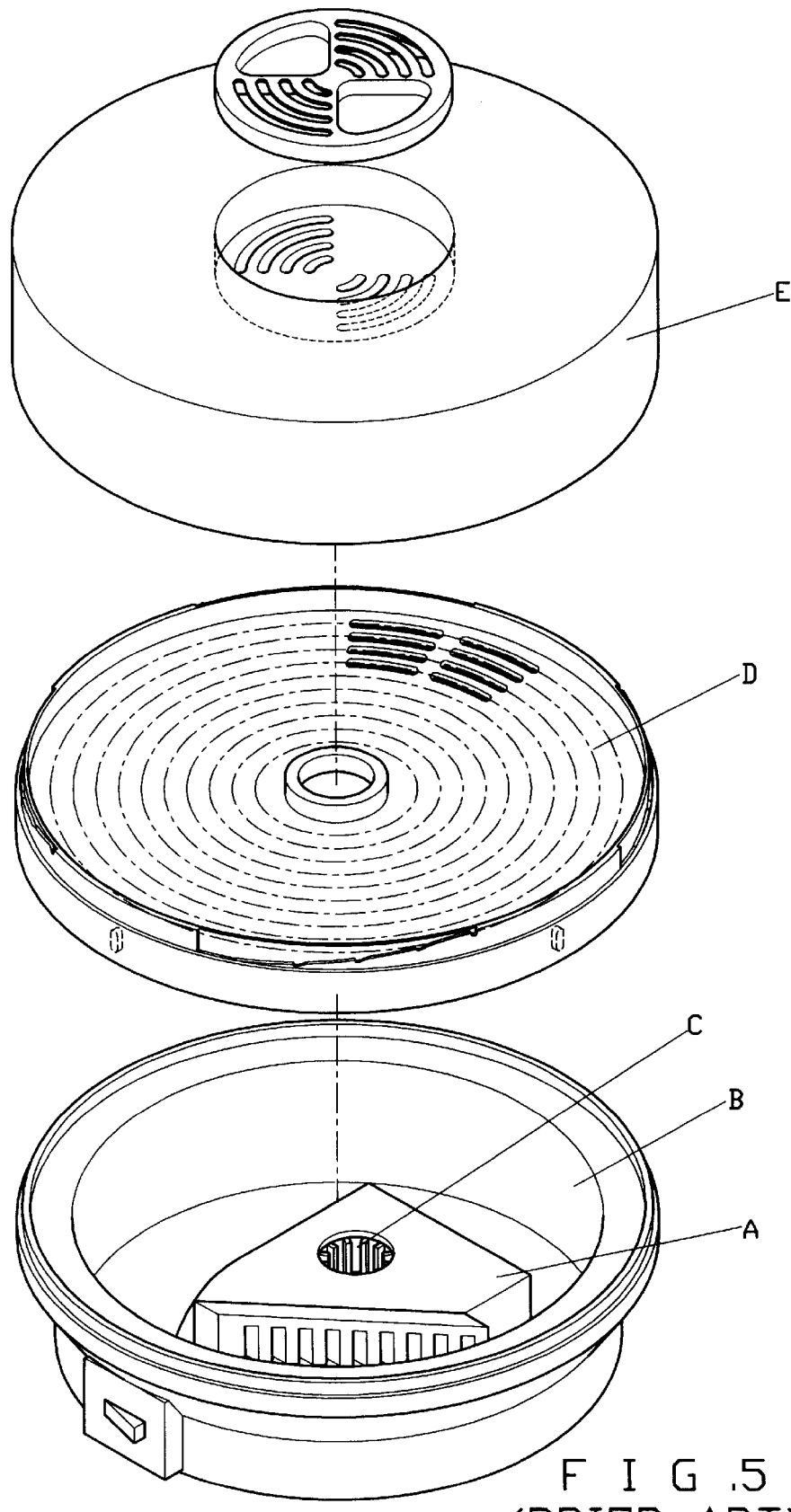
FIG. 5 is a prior art of a food dehydrator.

Further, the present invention may be stacked together with a plural screens 4, as shown in FIG. 4. The screen 4 is stacked together by securing the stoppers 44 of each screen 4 on to the locator 432 of the other screen 4. The height of the screens 4 are adjustable to match with the size of the food.

I claim:

1. A food dehydrator comprises a base, a rotating frame, an isolator, a screen and a cover, wherein said base having a hollow portion at the center accommodating a whirlwinder therein, said isola or seated on the base, said screen having a plural apertures on the surface, said cover covered on the screen, and the improvements comprising:

said base having a motor mounted in the center portion, with at least a spindle extending upwardly through said isolator, said isolator having an aperture, a rotating frame being adapted in the shape of said base and having a number of wheels rotatably secured to the edge of said rotating frame, said rotating frame comprising a center small ring for said spindle of the motor to pass therethrough, thus the screen is controlled by said motor to spin.

2. The food dehydrator as recited in claim 1, wherein said whirlwinder being eccentrically mounted to said base and said isolator comprising an aperture for hot air blowing outward there through.

3. The food dehydrator as recited in claim 1, wherein said base comprising a wall to block said hot air from passing and to guide said hot air to blow out from the correct direction.

* * * * *